(12) United States Patent
Kochesfahani (10) Patent No.: US 11,524,448 B2
(45) Date of Patent: Dec. 13, 2022

(54) COMPOSITIONS AND METHODS FOR FUSED FILAMENT FABRICATION

(71) Applicant: Magris Talc USA, Inc., Three Forks, MT (US)

(72) Inventor: Saied Kochesfahani, San Jose, CA (US)

(73) Assignee: Magris Talc USA, Inc., Three Forks, MT (US)

( * ) Notice: Subject to any disclaimer, the term of this patent is extended or adjusted under 35 U.S.C. 154(b) by 659 days.

(21) Appl. No.: 16/378,661

(22) Filed: Apr. 9, 2019

(65) Prior Publication Data

US 2019/0275784 A1 Sep. 12, 2019

Related U.S. Application Data

(62) Division of application No. 15/039,592, filed as application No. PCT/US2014/064493 on Nov. 7, 2014, now abandoned.

(60) Provisional application No. 61/902,374, filed on Nov. 11, 2013.

(51) Int. Cl.
| | |
|---|---|
| *B33Y 10/00* | (2015.01) |
| *B29C 64/118* | (2017.01) |
| *B32B 27/08* | (2006.01) |
| *B32B 27/20* | (2006.01) |
| *B32B 27/22* | (2006.01) |
| *B32B 27/36* | (2006.01) |
| *B33Y 70/00* | (2020.01) |
| *B33Y 80/00* | (2015.01) |
| *C08K 3/34* | (2006.01) |
| *B29K 67/00* | (2006.01) |
| *B29K 105/00* | (2006.01) |
| *B29K 105/16* | (2006.01) |

(52) U.S. Cl.
CPC .......... *B29C 64/118* (2017.08); *B32B 27/08* (2013.01); *B32B 27/20* (2013.01); *B32B 27/22* (2013.01); *B32B 27/36* (2013.01); *B33Y 70/00* (2014.12); *B33Y 80/00* (2014.12); *C08K 3/34* (2013.01); *B29K 2067/046* (2013.01); *B29K 2105/0005* (2013.01); *B29K 2105/16* (2013.01); *B29K 2995/004* (2013.01); *B33Y 10/00* (2014.12); *C08K 2201/002* (2013.01); *C08K 2201/005* (2013.01); *C08K 2201/006* (2013.01); *C08K 2201/018* (2013.01)

(58) Field of Classification Search
CPC ........ B33Y 10/00; B33Y 70/00; B33Y 70/10; B33Y 80/00; B29K 2067/046; B32B 27/08; B32B 27/20; B32B 27/22; B32B 27/36; C08K 3/34; C08K 3/346; C08K 2003/3045; C08K 2003/265; C08L 67/04
See application file for complete search history.

(56) References Cited

U.S. PATENT DOCUMENTS

| | | | |
|---|---|---|---|
| 4,131,591 A | 12/1978 | MacFarlane et al. | |
| 4,927,874 A * | 5/1990 | Weber | ...................... C08K 9/08 524/451 |
| 6,228,923 B1 | 5/2001 | Lombardi et al. | |
| 6,869,985 B2 * | 3/2005 | Mohanty | ................. B32B 27/36 524/297 |
| 8,604,123 B1 * | 12/2013 | Weismann | ............. C08K 3/346 524/401 |
| 11,186,717 B2 * | 11/2021 | Leenders | ................. C08L 79/00 |
| 2005/0154148 A1 * | 7/2005 | Nakamichi | ............. C08L 67/04 525/450 |
| 2007/0241482 A1 * | 10/2007 | Giller | .................... B29C 64/165 264/494 |
| 2011/0224385 A1 * | 9/2011 | Shoji | ....................... C08L 67/04 525/437 |
| 2012/0296017 A1 | 11/2012 | Tsuboi et al. | |
| 2013/0297320 A1 | 11/2013 | Buser et al. | |
| 2020/0247995 A1 * | 8/2020 | Marchese | ............... C08L 77/08 |
| 2021/0206947 A1 * | 7/2021 | Inada | .................... C08L 101/00 |

FOREIGN PATENT DOCUMENTS

| | | |
|---|---|---|
| GB | 2 149 198 A | 6/1985 |
| WO | WO 2012/138842 | 10/2012 |
| WO | WO 2013/131649 A1 | 9/2013 |

OTHER PUBLICATIONS

Crystallization kinetics of poly(lactic acid)-talc composites D. Battegazzore, S. Bocchini*, A. Frache Apr. 2011 (Year: 2011).
Talc as a nucleating agent and reinforcing filler in poly(lactic acid) composites A. Shakoor N.L. Thomas Mar. 2013 (Year: 2013) https://onlinelibrary.wiley.com/doi/pdf/10.1002/pen.23543.
International Search Report and Written Opinion dated Jan. 27, 2015, in International Application No. PCT/US2014/064493 (11 pages).
Loughborough University Institutional Repository Talc as a nucleating agent and reinforcing filler in poly(lactic acid) composites https://dspace.lboro.ac.uk/dspace-jspui/bitstream/2134/13942/3/Talc%20as%20a%20Nucleating%20Agent%20and%20Reinforcing (Year: 2013).

* cited by examiner

*Primary Examiner* — Jane L Stanley
(74) *Attorney, Agent, or Firm* — Freeborn & Peters, LLP (57) ABSTRACT

A composition for fused filament fabrication may include polylactic acid resin and talc. The composition may range from 50% by weight to 99% by weight polylactic acid resin, and from 7% by weight to 40% by weight talc. The composition may be configured as filaments or pellets adapted to be used in a fused filament fabrication process. A method for generating a resin-based structure may include providing a resin source that may include polylactic acid resin and talc. The resin source may include from 50% by weight to 99% by weight polylactic acid resin, and from 7% by weight to 40% by weight talc. The method may also include heating the resin source to a temperature greater than the melting temperature for semi-crystalline resins or significantly greater than glass transition temperature for amorphous resins, and depositing the heated resin source in a layered manner to form the resin-based structure.

9 Claims, 4 Drawing Sheets

COMPOSITIONS AND METHODS FOR FUSED FILAMENT FABRICATION

CLAIM FOR PRIORITY

This application is a divisional application of U.S. application Ser. No. 15/039,592, filed May 26, 2016, which is a U.S. national phase entry under 35 U.S.C. § 371 from PCT International Application No. PCT/US2014/064493, filed Nov. 7, 2014, which claims the benefit of priority of U.S. Provisional Patent Application No. 61/902,374, filed Nov. 11, 2013, the subject matter of which is incorporated herein by reference in its entirety.

DESCRIPTION

The present disclosure relates to compositions and methods related to fused filament fabrication, and more particularly, to polymer compositions including talc, mica, kaolin, bentonite, montmorillonite, pyrophyllite, vermiculite, halloysite, wollastonite, calcium carbonate, titania, perlite, diatomaceous earth, combinations thereof, and/or the like. The present disclosure may also relate to methods for generating resin-based structures including providing polymer compositions including talc, mica, kaolin, bentonite, montmorillonite, pyrophyllite, vermiculite, halloysite, wollastonite, calcium carbonate, titania, perlite, diatomaceous earth, combinations thereof, and/or the like.

BACKGROUND

Solid objects having complex shapes may be manufactured by additive manufacturing methods that are also sometimes referred to as "three-dimensional printing." Three-dimensional printing may generally refer to a process by which three-dimensional objects are manufactured via an additive process, where successive layers of material are laid down in different shapes to form the object. For example, a digital or virtual blueprint of the object obtained from computer-aided design software is sliced into digital cross-sections of the object, and the three-dimensional printer successively lays down the material according to the digital cross-sections to form the object. Once completed, the three-dimensional object has been "printed."

According to one example of three-dimensional printing sometimes referred to as "fused filament fabrication" (e.g., FUSED DEPOSITION MODELING®), polymer filament (or metal wire) is unwound from a coil to supply material to an extrusion nozzle configured to melt the filament and promote or stop the flow of molten material used for additive manufacturing of the object on a manufacturing surface or printing plate. The combination of nozzle and printing plate are configured to move in horizontal and vertical directions to control deposition of the molten material using a computer-aided manufacturing or computer-aided design (CAD) program. By forming the successive layers according to the computer-aided design of the object, the object may be "printed."

Due primarily to its favorable dimensional stability, polylactic acid (PLA, $(C_3H_4O_2)$) is a commonly used polymer for fused filament fabrication processes. However, PLA is a semi-crystalline polymer with slow crystallization kinetics that normally forms an amorphous plastic with weak thermal stability and a low glass transition temperature $T_g$ of about 50-60° C. As a result, PLA may soften during storage, transportation, or upon extended sun exposure. The weak thermal stability of PLA becomes even more limiting for load bearing applications where an improved heat deflection temperature (HDT) is desired. It has been shown that increasing heat deflection temperature of PLA requires achieving over 30% to 35% crystalline content. This cannot be easily achieved in typical plastics manufacturing techniques such as injection molding or extrusion without some degree of in-process or post-process annealing.

In fused filament fabrication processed (e.g., FUSED DEPOSITION MODELING®), in-process annealing is not possible since it requires maintaining the printed object at temperatures higher than the glass transition temperature $T_g$ for certain period of time, which is not compatible with layer-by-layer deposition of molten plastics according to this manufacturing method. In addition, post-manufacturing annealing of PLA objects made with fused filament fabrication is not possible, since free form objects made with the additive manufacturing techniques would not maintain their shape at temperatures higher than the glass transition temperature $T_g$ that is required for annealing. Therefore, it may be desirable to provide a PLA composition that allows improving thermal stability of PLA objects made with fused filament fabrication and/or makes post-fabrication annealing of such objects possible to achieve durable and thermally stable printed objects.

SUMMARY

According to one aspect, a composition for fused filament fabrication may include polylactic acid resin and talc. The composition may range from 50% by weight to 93% by weight polylactic acid resin, and from 7% by weight to 40% by weight talc and/or 0% by weight to 40% by weight of mica, kaolin, bentonite, pyrophyllite, vermiculite, halloysite, wollastonite, perlite, diatomaceous earth, combinations thereof, and/or the like. The composition may be adapted to be used in a fused filament fabrication process, and may include other materials, components, or processing aids typically used to control or modify attributes such as color, flexibility, flowability, processability, or the like. According to some aspect, the composition is configured as filament, bars, pellets, powder, or other shapes, adapted to be used in a fused filament fabrication process.

According to some aspects, the composition (e.g., the polylactic acid resin moiety) may contain plasticizers, impact modifiers, pigments, dyes, colorants, stabilizers, and/or other polymer additives or processing aids generally used to modify resin properties including, for example, flexibility, brittleness, color, and/or processability.

According to some aspects, the composition (e.g., the talc moiety) may be supplemented or replaced with from 0% (e.g., greater than 0%) to 40% of at least one mineral from the group consisting of mica, kaolin, bentonite, montmorillonite, pyrophyllite, vermiculite, halloysite, wollastonite, calcium carbonate, titania, perlite, diatomaceous earth, and/or the like.

According to another aspect, a method for generating a resin-based structure may include providing a resin source that may include polylactic acid resin and talc, mica, kaolin, bentonite, pyrophyllite, vermiculite, halloysite, wollastonite, perlite, diatomaceous earth, sodium oxysulfate, combinations thereof, and/or the like. The resin source may include from 50% by weight to 93% by weight polylactic acid resin, and from 7% by weight to 40% by weight talc, and/or 0% by weight to 40% by weight of mica, kaolin, bentonite, pyrophyllite, vermiculite, halloysite, wollastonite, perlite, diatomaceous earth, sodium oxysulfate, and/or the like. The method may also include heating the resin source to a temperature higher than the melting temperature for semi-crystalline resins or significantly higher than the glass transition temperature for amorphous resins, and depositing the heated resin source in a layered manner to form the resin-based structure.

According to another aspect, a method for generating a resin-based structure method may include providing a resin source comprising polylactic acid resin and talc, wherein the resin source comprises from 50% by weight to 99% by weight polylactic acid resin, and wherein the resin source comprises from 7% by weight to 40% by weight talc. The method may further include heating the resin source to a temperature greater than melting temperature for semi-crystalline resins or significantly greater than the glass transition temperature for amorphous resins (e.g., from 180° C. to 220° C. for polylactic acid) to allow flow in molten state through a nozzle to produce a thin strand of molten resin source. The method may also include depositing the heated resin source in a layered manner based on a computer-aided design (CAD) program to form a resin-based object or structure (e.g., according to fused filament fabrication).

BRIEF DESCRIPTION OF THE DRAWINGS

FIGS. 2(a)-2(f) provide visual indications of the difference in thermal stability of different specimens after oven heating at temperatures above glass transition temperature of the resin.

DESCRIPTION OF EXEMPLARY EMBODIMENTS

Polylactic acid (PLA, $(C_3H_4O_2)$), which is a commonly used material in fused filament fabrication process, such as, for example, FUSED DEPOSITION MODELING®, has relatively weak thermal stability and a low glass transition temperature In order to improve the thermal stability of polylactic acid when used, for example, in FUSED DEPOSITION MODELING®, the polylactic acid may be annealed either during processing or during post-processing thermal treatment. Annealing generally refers to maintaining the resin at a temperature above the polymer glass transition temperate ($T_g$) for a period of time required to allow sufficient crystallization of the resin. Annealing may be achieved during polymer processing by increasing the residence time of manufactured objects, e.g., molded products, at elevated temperatures. Alternatively, following processing, the manufactured object may be annealed by placing it at elevated temperatures for a certain period of time. This may enhance the thermal stability and/or increase the heat deflection temperature of the formed object. According to some embodiments, it has been surprisingly discovered that the addition of talc to a resin-based composition (e.g., including polylactic acid) may improve the thermal stability of an object formed by fused filament fabrication (e.g., FUSED DEPOSITION MODELING®) for non-loadbearing daily usage, transportation or storage activities or to allow post-production annealing at elevated temperatures to increase the heat deflection temperature of the object for loadbearing applications. According to some embodiments, it has been discovered that the addition of talc and/or mica, kaolin, bentonite, montmorillonite, pyrophyllite, vermiculite, halloysite, wollastonite, calcium carbonate, titania, perlite, diatomaceous earth, sodium oxysulfate, and/or the like, may also improve the printability of an object formed by fused filament fabrication (e.g., FUSED DEPOSITION MODELING®) by:

increasing the tendency of PLA based resin source to attach to the print surface (e.g., glass, painter's blue tape, etc.) without the need for using special glues, a heated bed, or allowing the use of lower print bed temperatures; and/or reducing the tendency of objects formed (or printed) to warp or curl at the edges of the shape to prevent detachment from the print surface, maintaining the integrity of printed objects, or enhancing their accuracy and appeal; and/or allowing the use of lower melt temperatures, which reduces PLA degradation and improves consistency and continuity of fused filament during printing; and/or improving the resolution or appearance of objects formed via controlling the flowability of molten resin source or modifying physical and/or mechanical properties of the material.

According to some embodiments, this may be achieved with or without reduced amounts of other additives, such as, for example, plasticizers, pigments/dyes, processing aids, and/or nucleating agents (i.e., chemical and/or mineral nucleating agents). According to some embodiments, other additives (e.g., plasticizers, pigments/dyes, processing aids, and/or nucleating agents) may be added to the resin to improve flexibility, processing, or other properties, or to further improve the thermal stability and/or increase the heat deflection temperature of the formed object.

While not wishing to be bound by theory, it is believed that when added to a resin or polymer used in fused filament fabrication (e.g., polylactic acid), talc is an effective nucleating agent for crystallization of the polymer. For example, polylactic acid is known to have a slow crystallization rate. As a result, polylactic acid objects produced by many polymer processing techniques contain no or very small amounts of crystalline structure and behave like amorphous polymers. Such polylactic acid objects soften at temperatures above the glass transition temperature $T_g$, which is about 55° C., and thus, may deform or suffer a change in appearance under minimal load, for example, during storage, transportation, or prolonged exposure to the sun. However, the presence of a crystalline phase within the polymer structure may reduce the mobility of polymer chains at temperatures greater than the glass transition temperature $T_g$, thereby enhancing the thermal stability of the polymer. It is believed that a minimum of about 30% to 35% crystalline content may be required to significantly increase thermal stability of polylactic acid, such that its heat deflection temperature is about 70° C. or higher, as measured according to Standard ASTM or ISO standards.

While not wishing to be bound by theory, it is believed that the addition of talc significantly reduces the crystallization half-time of polymers such as polylactic acid, perhaps from a few hours to only a few minutes or less, for example, with isothermal annealing. While annealing at temperatures higher than the glass transition temperature $T_g$ to achieve crystalline contents of 30%-35% or higher and heat deflection temperatures exceeding 70° C. may be possible for some polymer processing methods, for example, injection molding, it may not be feasible for most objects produced by additive manufacturing or fused filament fabrication (e.g. FUSED DEPOSITION MODELING®), since such free-form processing methods do not use a mold or other support to prevent deformation of the manufactured object when they soften at annealing temperatures above the glass transition temperature $T_g$. Using nucleating and/or reinforcing mineral additives, e.g., talc, in the polymer compound may allow printed objects to keep their shape and integrity during annealing, which may be required for improving their thermal stability, HDT, and/or mechanical properties.

According to some embodiments, the addition to, for example, polylactic acid resin, of talc and/or one or more other minerals, such as, for example, mica, kaolin, bentonite, montmorillonite, pyrophyllite, vermiculite, halloysite, wollastonite, calcium carbonate, titania, perlite, diatomaceous earth, sodium oxysulfate, and/or the like, may improve one or more of the following characteristics of an object formed by fused filament fabrication relative to objects formed via conventional polylactic acid: warpage (i.e., reduced warpage), impact resistance (i.e., increased impact resistance), and tensile elongation at break (i.e., increased tensile elongation at break). According to some embodiments, the improvements in one or more of these characteristics may be further improved by the addition of plasticizers, such as, for example, polyethylene glycol.

For example, with respect to warpage, the solidification shrinkage and thermal contraction upon cooling of an object produced by fused filament fabrication may result in curling at the edges and warpage of the base of printed shapes. Larger printed objects normally have higher tendencies to warp. For this reason "Flat Bar" and Test Box" shapes may be selected as two internal standards for studying the warpage and detachment of shapes printed with fused filament fabrication printers. For example, warpage may be measured as follows: "flat bar" warpage in millimeters (mm) is the height of one end of a printed bar from a horizontal surface, when the bar is laid flat on the horizontal surface, and its other end is pressed and held parallel onto the horizontal surface; and "test box" in mm is the maximum height measured (as explained above for the flat bar warpage), when the test box is laid flat on its base on a horizontal surface, and one edge is pressed against and held parallel onto the surface and the height of opposing edge is measured. The measurement is repeated for all two edges and the maximum reading is used as warpage indicator.

According to some embodiments, at mineral loading of, for example, from about 5% to about 30% (e.g., from about 10% to about 20%) warpage may be reduced relative to conventional PLA. For example, flat bar warpage may be reduced by, for example, from about 5% to about 60%, from about 5% to about 50%, from about 5% to about 40%, from about 5% to about 30%, from about 5% to about 25%, from about 5% to about 20%, from about 5% to about 15%, or from about 5% to about 10%. According to some embodiments, test box warpage may be reduced by, for example, from about 5% to about 60%, from about 5% to about 50%, from about 5% to about 40%, from about 5% to about 30%, from about 5% to about 25%, from about 5% to about 20%, from about 5% to about 15%, or from about 5% to about 10%.

According to some embodiments, at mineral loading of, for example, from about 5% to about 30% (e.g., from about 10% to about 20%) impact resistance may be increased relative to conventional PLA. For example, impact resistance may be increased by, for example, from about 10% to about 150%, from about 10% to about 125%, from about 10% to about 100% (i.e., doubled), from about 10% to about 75%, from about 10% to about 50%, from about 10% to about 40%, from about 10% to about 30%, or from about 10% to about 20%.

According to some embodiments, at mineral loading of, for example, from about 5% to about 30% (e.g., from about 10% to about 20%) tensile elongation at break may be increased relative to conventional PLA. For example, tensile elongation at break may be increased by, for example, from about 10% to about 150%, from about 10% to about 125%, from about 10% to about 100% (i.e., doubled), from about 10% to about 75%, from about 10% to about 50%, from about 10% to about 40%, from about 10% to about 30%, or from about 10% to about 20%.

According to some embodiments, at mineral loading of, for example, from about 5% to about 30% (e.g., from about 10% to about 20%) impact resistance may be increased relative to conventional PLA. For example, impact resistance may be increased by, for example, from about 10% to about 150%, from about 10% to about 125%, from about 10% to about 100% (i.e., doubled), from about 10% to about 75%, from about 10% to about 50%, from about 10% to about 40%, from about 10% to about 30%, or from about 10% to about 20%.

According to some embodiments, a composition for fused filament fabrication includes polylactic acid resin and talc. The composition ranges from 50% by weight to 93% by weight polylactic acid resin, and from 7% by weight to 40% by weight talc. In other embodiments, less talc may be present in the composition when other minerals are present. According to some embodiments, the composition is configured to be adapted for use in a fused filament fabrication process.

According to some embodiments, the composition may include, for example, plasticizers, impact modifiers, pigments, dyes, colorants, stabilizers, and/or other additives or processing aids. For example, the composition may include plasticizers, impact modifiers, pigments, dyes, colorants, stabilizers, and/or other additives or processing aids used in polymer processing known to those skilled in the art. According to some embodiments, the composition (e.g., the talc moiety) may be supplemented or replaced with from 0% (e.g., greater than 0%) to 40% of at least one mineral from the group consisting of mica, kaolin, bentonite, montmorillonite, pyrophyllite, vermiculite, halloysite, wollastonite, calcium carbonate, titania, perlite, diatomaceous earth, and/or the like.

According to some embodiments, the talc has a median particle size less than 18 microns, a median particle size less than 12 microns, a median particle size less than 10 microns, a median particle size less than 8 microns, a median particle size less than 6 microns, a median particle size less than 4 microns, a median particle size less than 2 microns, or a median particle size less than 1 micron.

"Median particle size." as used herein, for example, in the context of particle size distribution (psd), is measured in terms of equivalent spherical diameter (esd). Sometimes referred to as the "$d_{50}$" value, median particle size and other particle size properties referred to in the present application may be measured in a well-known manner, for example, by sedimentation of the particle material in a fully-dispersed condition in an aqueous medium using a SEDIGRAPH 5100® machine, as supplied by Micromeritics Corporation. Such a machine may provide measurements and a plot of the cumulative percentage by weight of particles having a size, referred to in the art as "equivalent spherical diameter" (esd), less than the given esd values. The median particle size ($d_{50}$) is the value that may be determined in this manner of the particle esd at which there are 50% by weight of the particles that have an esd less than the indicated median particle size (the $d_{50}$ value).

According to some embodiments, the talc has a top particle size ($d_{90}$) less than 150 microns, a top particle size less than 100 microns, a top particle size less than 50 microns, a top particle size less than 20 microns, a top particle size less than 10 microns, or a top particle size less than 6 microns. "Top particle size," or "$d_{90}$," as used herein, for example, in the context of particle size distribution (psd), is defined as the size for which 90 percent of the volume of the particles have an esd smaller than the indicated top particle size (the $d_{90}$ value). According to some embodiments, the non-talc minerals identified herein may have the same (or similar) particle size distributions (e.g., $d_{50}$ and $d_{90}$) as the particle size distributions identified herein for talc.

According to some embodiments, the talc has a Hegman rating of 2 or greater, a Hegman rating of 3 or greater, a Hegman rating of 4 or greater, a Hegman rating of 5 or greater, a Hegman rating of 6 or greater, a Hegman rating of 7 or greater, or a Hegman rating of 7.5 or greater. According to some embodiments, the talc has a BET surface area greater than 2 $m^2/g$, a BET surface area greater than 4 $m^2/g$, a BET surface area greater than 6 $m^2/g$, a BET surface area greater than 8 $m^2/g$, or a BET surface area greater than 10 $m^2/g$. According to some embodiments, the talc has a BET surface area less than 20 $m^2/g$, a BET surface area less than 15 $m^2/g$, a BET surface area less than 12 $m^2/g$, or a BET surface area less than 10 $m^2/g$. According to some embodiments, the talc has a BET surface area ranging from 2 $m^2/g$ to 20 $m^2/g$, a BET surface area ranging from 4 $m^2/g$ to 15 $m^2/g$, a BET surface area ranging from 4 $m^210$ to 10 $m^2/g$, or a BET surface area ranging from 10 $m^2/g$ to 15 $m^2/g$.

According to some embodiments, the talc has an oil absorption less than 60 grams per 100 grams of talc, less than 50 grams per 100 grams of talc, or less than 40 grams per 100 grams of talc. According to some embodiments, the talc has an oil absorption ranging from 20 grams per 100 grams of talc to 60 grams per 100 grams of talc, or ranging from 25 grams per 100 grams of talc to 55 grams per 100 grams of talc.

According to some embodiments, the talc has a shape factor greater than 10, greater than 20, greater than 30, greater than 40, greater than 50, greater than 75, or greater than 100. "Shape factor," as used herein, is a measure of the ratio of particle diameter to particle thickness for a population of particles of varying size and shape as measured using the electrical conductivity methods, apparatuses, and equations described in U.S. Pat. No. 5,576,617 ("the '617 patent"), which is incorporated herein by reference. As the technique for determining shape factor is further described in the '617 patent, the electrical conductivity of a composition of an aqueous suspension of orientated particles under test is measured as the composition flows through a vessel. Measurements of the electrical conductivity are taken along one direction of the vessel and along another direction of the vessel transverse to the first direction. Using the difference between the two conductivity measurements, the shape factor of the particulate material under test is determined.

According to some embodiments, the talc has a shape factor less than 200, less than 150, or less than 100. According to some embodiments, the talc has a shape factor ranging from 10 to 200, ranging from 15 to 150, ranging from 15 to 50, or ranging from 15 to 100.

According to some embodiments, the composition ranges from 7% by weight to 40% by weight talc. For example, the composition ranges from 10% by weight to 30% by weight talc, from 10% by weight to 25% by weight talc, from 10% by weight to 20% by weight talc, from 20% by weight to 30% by weight talc, or from 15% by weight to 25% by weight talc.

According to some embodiments, the composition may use at least one other mineral by itself or in addition to talc, for example, from the group consisting of kaolin, bentonite, montmorillonite, mica, pyrophyllite, vermiculite, halloysite, wollastonite, calcium carbonate, titania, perlite, diatomaceous earth, combinations thereof, or the like. According to some embodiments, these minerals may have the same (or similar) particle size distributions (e.g., do and dg) as the particle size distributions identified herein for talc.

According to some embodiments, a method for generating a resin-based structure includes providing a resin source including polylactic acid resin and talc. The resin source includes from 50% by weight to 99% by weight polylactic acid resin, and from 7% by weight to 40% by weight talc. The method includes heating the resin source to a temperature higher than the melting temperature for semi-crystalline resins or significantly higher than glass transition temperature for amorphous resins, and depositing the heated resin source in a layered manner to form the resin-based structure.

According to some embodiments, the talc of the resin source has a median particle size less than 18 microns, a median particle size less than 12 microns, a median particle size less than 10 microns, a median particle size less than 8 microns, a median particle size less than 6 microns, a median particle size less than 4 microns, a median particle size less than 2 microns, or a median particle size less than 1 micron.

According to some embodiments, the talc or the resin source has a top particle size ($d_{90}$) less than 150 microns, a top particle size less than 100 microns, a top particle size less than 50 microns, a top particle size less than 20 microns, a top particle size less than 10 microns, or a top particle size less than 6 microns.

According to some embodiments, the talc of the resin source has a Hegman rating of 2 or greater, a Hegman rating of 3 or greater, a Hegman rating of 4 or greater, a Hegman rating of 5 or greater, a Hegman rating of 6 or greater, a Hegman rating of 7 or greater, or a Hegman rating of 7.5 or greater. According to some embodiments, the talc of the resin source has a BET surface area greater than 2 $m^2/g$, a BET surface area greater than 4 $m^2/g$, a BET surface area greater than 6 $m^2/g$, a BET surface area greater than 8 $m^2/g$, or a BET surface area greater than 10 $m^2/g$. According to some embodiments, the talc of the resin source has a BET surface area less than 20 $m^2/g$, a BET surface area less than 15 $m^2/g$, a BET surface area less than 12 $m^2/g$, or a BET surface area less than 10 $m^2/g$. According to some embodiments, the talc of the resin source has a BET surface area ranging from 2 m²/g to 20 m²/g, a BET surface area ranging from 4 m²/g to 15 m²/g, a BET surface area ranging from 4 m²/g to 10 m²/g, or a BET surface area ranging from 10 m²/g to 15 m²/g.

According to some embodiments, the talc of the resin source has an oil absorption less than 60 grams per 100 grams of talc, less than 50 grams per 100 grams of talc, or less than 40 grams per 100 grams of talc. According to some embodiments, the talc of the resin source has an oil absorption ranging from 20 grams per 100 grams of talc to 60 grams per 100 grams of talc, or ranging from 25 grams per 100 grams of talc to 55 grams per 100 grams of talo.

According to some embodiments, the talc of the resin source has a shape factor greater than 10, greater than 20, greater than 30, greater than 40, greater than 50, greater than 75, or greater than 100. According to some embodiments, the talc of the resin source has a shape factor less than 200, less than 150, or less than 100. According to some embodiments, the talc of the resin source has a shape factor ranging from 10 to 200, ranging from 15 to 150, ranging from 15 to 50, or ranging from 15 to 100.

According to some embodiments, the resin source ranges from 7% by weight to 40% by weight talc. For example, the resin source ranges from 10% by weight to 30% by weight talc, from 10% by weight to 25% by weight talc, from 10% by weight to 20% by weight talc, from 20% by weight to 30% by weight talc, or from 15% by weight to 25% by weight talc.

According to some embodiments, the resin source may use at least one other mineral by itself or in addition to talc, for example, from the group consisting of kaolin, bentonite, montmorillonite, mica, pyrophyllite, vermiculite, halloysite, wollastonite, calcium carbonate, titania, perlite, diatomaceous earth, combinations thereof, and/or the like.

According to some embodiments, a method for generating a resin-based structure method may include providing a resin source comprising polylactic acid resin and talc, wherein the resin source comprises from 50% by weight to 99% by weight polylactic acid resin, and wherein the resin source comprises from 7% by weight to 40% by weight talc. The method may further include heating the resin source to a temperature greater than melting temperature for semi-crystalline resins or significantly greater than the glass transition temperature for amorphous resins (e.g., from 180° C. to 220° C. for polylactic acid) to allow flow in molten state through a nozzle to produce a thin strand of molten resin source. The method may also include depositing the heated resin source in a layered manner based on a computer-aided design (CAD) program to form a resin-based object or structure (e.g., according to fused filament fabrication).

Examples

Several examples of resin-based compositions were tested to examine the thermal behavior of the exemplary compositions including polylactic acid. In particular, an angled beam test method was developed to examine the stability of resin-based structures including, for example, polylactic acid, formed by fused filament fabrication, upon exposure to high temperatures during normal day-to-day use or during post-fabrication annealing. The following test method is designed specifically to examine the temperature stability of resin-based structures, such as those formed of a resin including polylactic acid, which tends to soften above its glass transition temperature ($T_g$) of about 55° C. The method is suitable for examining structures or objects formed by additive manufacturing techniques, such as, for example, fused filament deposition (e.g., FUSED DEPOSITION MODELING®), because such structures or objects may be defined by a computer-aided design program and formed layer-by-layer as free-formed structures, which are not protected or confined within a mold, support, etc. Other test methods are contemplated.

Figure 1:
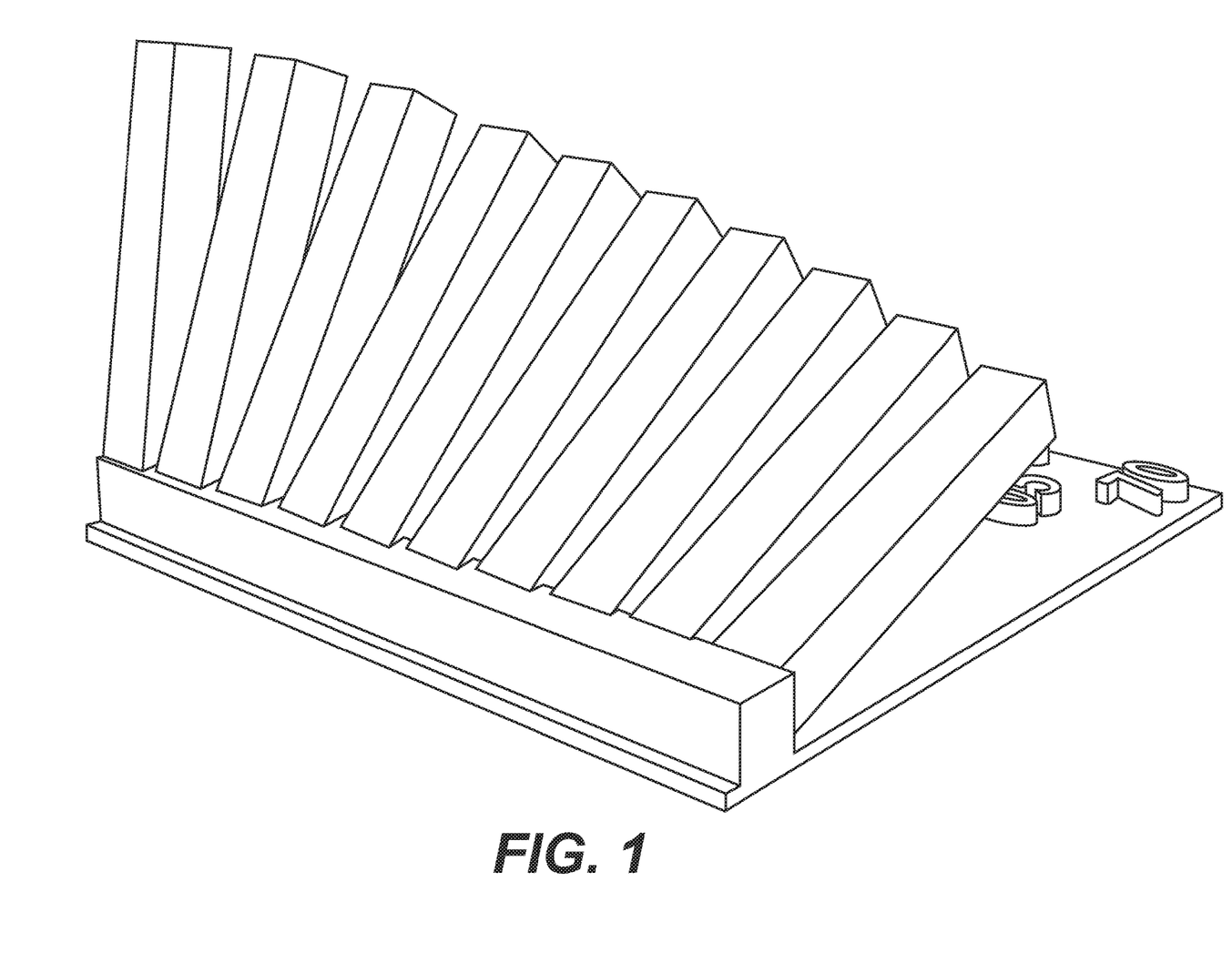
FIG. 1 is an exemplary embodiment of a test specimen for testing relative thermal stability of compositions used in an exemplary fused filament fabrication process.
Figure 2A:
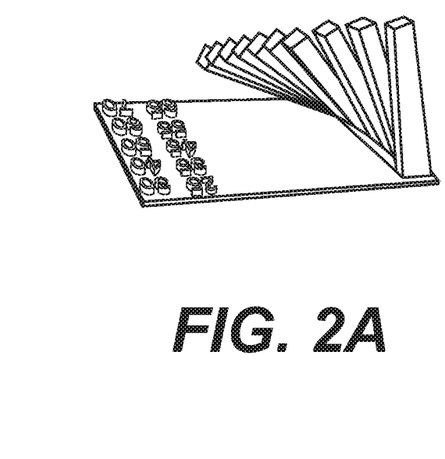
FIG. 2(a) a printed specimen prior to oven heating.
Figure 2B:
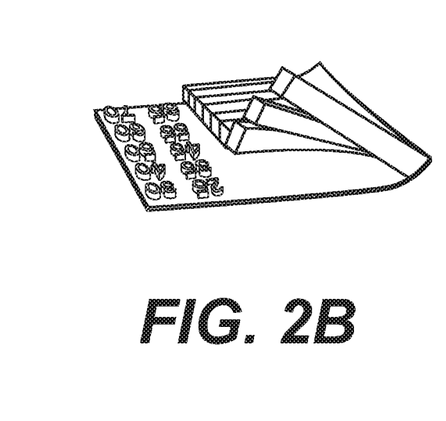
FIG. 2(b) a specimen printed using commercial unfilled PLA filament after oven heating at 70=C, FIG. 2(c) a specimen containing 10 wt % talc in the PLA after oven heating at 70° C., FIG. 2(d) a specimen containing 30 wt % talc in the PLA after oven heating at 70° C., FIG. 2(e) a specimen containing 20 wt % talc in the PLA after oven heating at 107° C., and FIG. 2(f) a specimen containing 30 wt % talc in the PLA after oven heating at 107° C.
Figure 2C:
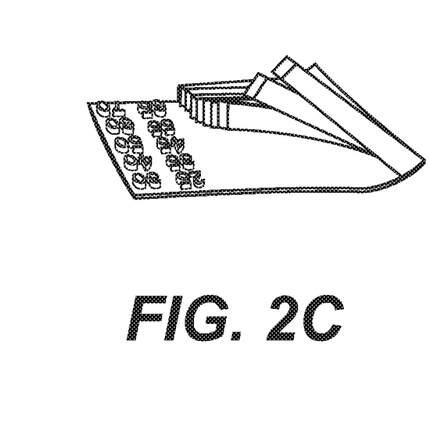
Figure 2D:
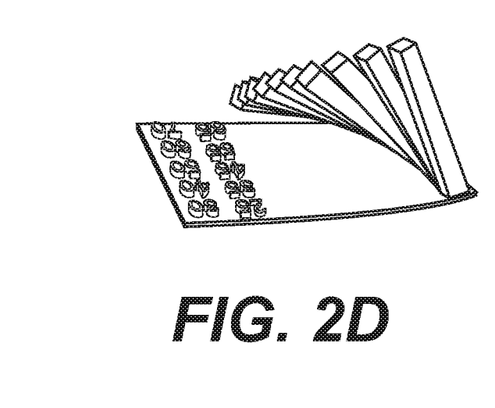
Figure 2E:
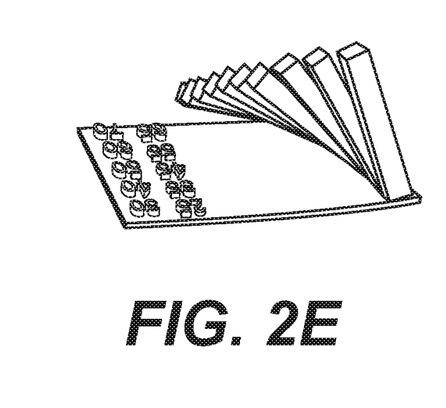
Figure 2F:
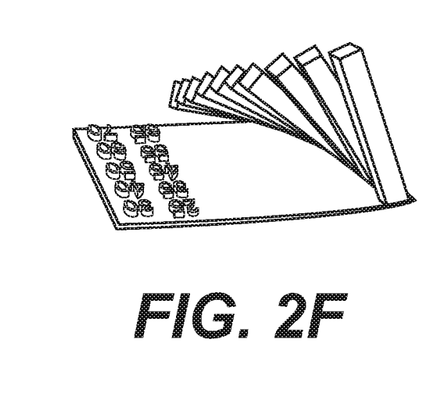

According to the exemplary test, a resin-based beam specimen for each example composition tested was formed or "printed" by fused filament fabrication, and each of the formed beam specimens was subjected to controlled heating to examine the thermal stability of the resulting, resin-based specimens. As shown in FIG. 1, the beam specimen selected for this exemplary test method was composed of a set of ten beams attached at the bottom to a support at different angles in a cantilever manner. The entire beam specimen sits on a thin square base measuring with 5 centimeters×5 centimeters in dimension. The beams are arranged such that they extend from the base at angles ranging from 10 to 70 degrees from a vertical orientation, such that the 70-degree beam is closest to the horizontal orientation, and the 10-degree beam is closest to the vertical orientation. All of the exemplary beams are 3 centimeters in length. The digital data to form the beam specimen tested is available on the Makerbot Thingiverse website at www.thingiverse.com, and more specifically at http://www.thingiverse.com/thing:100934. The computer-aided design for fused filament fabrication printing of the beam specimen may also be available for download from the same web-link.

As the angle of the beams increase, the load applied to the base of the beams increase. When the material of the beam structure becomes soft, it may deform under the load due to gravity. In particular, deformation occurs when the applied load is higher than the material's strength or stiffness. Deformation may also occur only if the material has reached or exceeded its softening point (e.g., at the glass transition temperature ($T_g$) in the case of an amorphous polymer such as, for example, polylactic acid). However, the presence of a crystalline structure, minerals, or other solids within the amorphous polymer may reduce the mobility of polymer chains or physically reinforce and strengthen the material. Thus, the exemplary beam specimen and testing method may provide a practical measure of relative stability of different shapes and compositions at each temperature.

According to the testing method, the beam specimens were "printed" with a selected infill amount based on the printer software. "Infill" is defined as the portion of the printed shape that is filled with printing material, with the balance being void fraction (e.g., 100% infill has zero void fraction, i.e., filaments of the fused filament deposition process are positioned next to each other, and 80% infill has a 20% void fraction). All of the tested beam specimens were printed with the same infill ratio and compared together in order to obtain a relative measure of material heat stability. Although, the method attempts to quantify the difference in heat stability, the results are still considered relative because the mechanical properties of the printed beam structures may vary from one fused filament fabrication printer to another, and with the selection of infill ratio and other processing parameters that are not standardized.

Once the beam specimens for each of the example compositions were formed or "printed," the printed specimens were placed in an oven at a target temperature. The target temperatures started from 50° C. (i.e., just below $T_g$ for polylactic acid) and were increased up to greater than 100° C., based on the stability of the material tested. Since heat history may affect crystallization and thermal stability of polylactic acid, each printed object was placed in the oven only once. In addition, temperature variations were minimized by placing the test specimens at the same location for the same duration in the oven to minimize variation in temperature exposure. Care was taken to also minimize the amount of time taken to place the objects in the oven and to minimize the temperature drop that occurs when the oven door is opened for this purpose. To ensure sufficient exposure to target temperature, the beam structures were placed in the oven for 20 to 30 minutes. FIGS. 2(a)-2(f) show pictures of several beam specimens after oven heating, indicating the effect of material on temperature stability of the specimen.

Following heating in the oven, the beam structures are observed, and the angles of beams are measured by determining the vertical and horizontal position of the suspended end of each beam relative to the base. Typically, the most deformed beams are those with the larger vertical angle (i.e., 70 degrees), and the heating effect decreases as the angle of the beams decreases (i.e., the 10-degree beam shows the least deformation as it is closest to a vertical orientation, resulting in less bending stress). According to this exemplary testing method, a single test creates multiple (up to ten) results that are indicative of the temperature stability of the tested beam specimen under different loads that are representative of what a typical printed plastic object could experience in daily usage or during post-fabrication annealing. The difference in load is experienced at the base of each beam, which results in the bending or deformation of the beam and an increased angle (compared to its original angle), depending on the heat stability of the material used to form the tested beam specimens. In this exemplary manner, the relative thermal stability of example compositions used to form the tested beam specimens may be evaluated and compared.

While the beam structure used in the test method was printed, for example, using fused filament fabrication (FFF), and its properties including thermal stability may vary depending on the material used and processing conditions employed, the test method developed could be used to evaluate the thermal stability of the final printed object (beam structure) regardless of variations in materials or processing conditions. Thus, it provides a method for Investigating the effect of such variables as materials and operating conditions on the results.

The software for forming the beam specimens was loaded into the FFF printer, and the infill ratio was selected. The infill ratio was kept constant for all specimens tested to allow a direct comparison of the material performance. Thereafter, the beam structures of the test specimens were printed. During printing, care was taken to ensure that the CAD program follows the same manufacturing pattern for each sample, and the shape of the beam structures was free of defects, especially at the base. Once printing was completed, the beam structures were allowed to cool to below 40° C. before removing them, and care was taken to avoid damage as the beam structures were removed from the support on which they were formed. This exemplary procedure was repeated to form a beam specimen for each sample composition being tested.

The testing oven was pre-heated to the desired temperature and maintained at a steady temperature. Care was taken to avoid or reduce temperature variations in the oven, so that the test specimens (the beam structures) were exposed to similar temperatures in the oven. A forced circulation oven was used to minimize temperature variation with sample position and radiation from the walls. The test specimens for comparison were all placed in the same tray, the oven door was quickly opened, the tray was quickly placed in a pre-selected position, and the oven door was quickly closed. The tray of specimens was allowed to remain in the oven for 20 minutes. Different oven exposure times are contemplated (e.g., 20 to 30 minutes). Once heating for the desired duration was completed, the tray of specimens was removed and allowed to cool.

Following cooling, the amount of deformation was observed and compared, by measuring the horizontal (X) and vertical (Y) positions of the suspended ends of the beams relative to their respective bases. Using the X and Y values measured for each beam, one can calculate the beam angle after oven heating using the following equation:

Angle of beam(from vertical position in degrees)
$=90-180\times(\tan^{-1}(Y/X))/\pi$.

Figure 3:
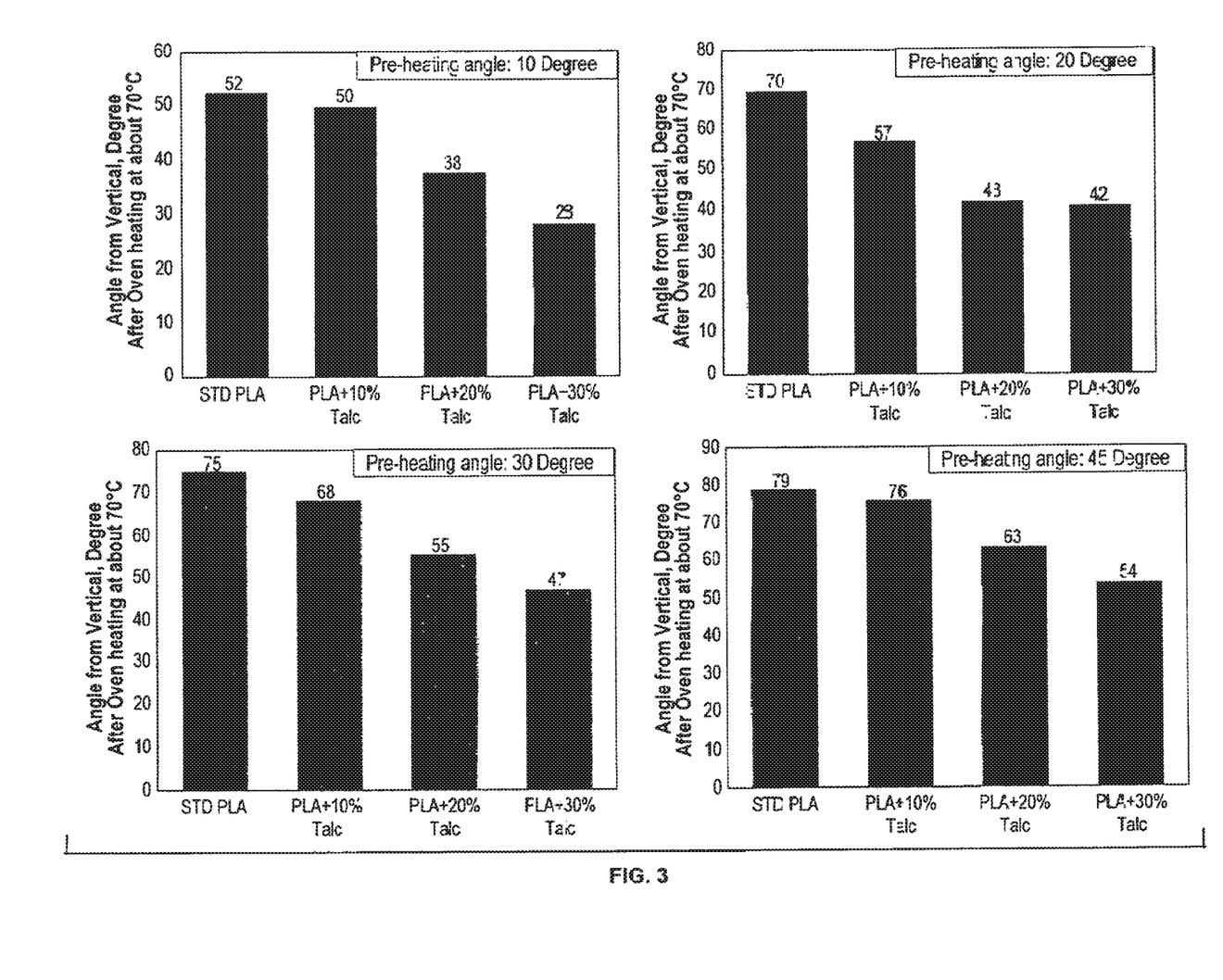
FIG. 3 contains four graphs showing test results for four examples of resin-based composition including polylactic acid used to form four respective test specimens via fused filament fabrication. The graphs show measured angles of 4 beams on each test specimen after oven heating at 70° C., where the pre-heating angles of the beams were 10 degrees, 20 degrees, 30 degrees, and 45 degrees.

FIG. 3 shows the temperature stability of four example compositions tested: (1) a composition including a commercial pure polylactic acid (Naturework's Ingeo® 4043D); (2) a composition including the same polylactic acid (Ingeo® 4043D) and 10% talc by weight ("10% Talc"); (3) a composition including polylactic acid and 20% talc by weight ("20% Talc"); and (4) a composition including polylactic acid and 30% talc by weight ("30% Talc")."

Figure 4:
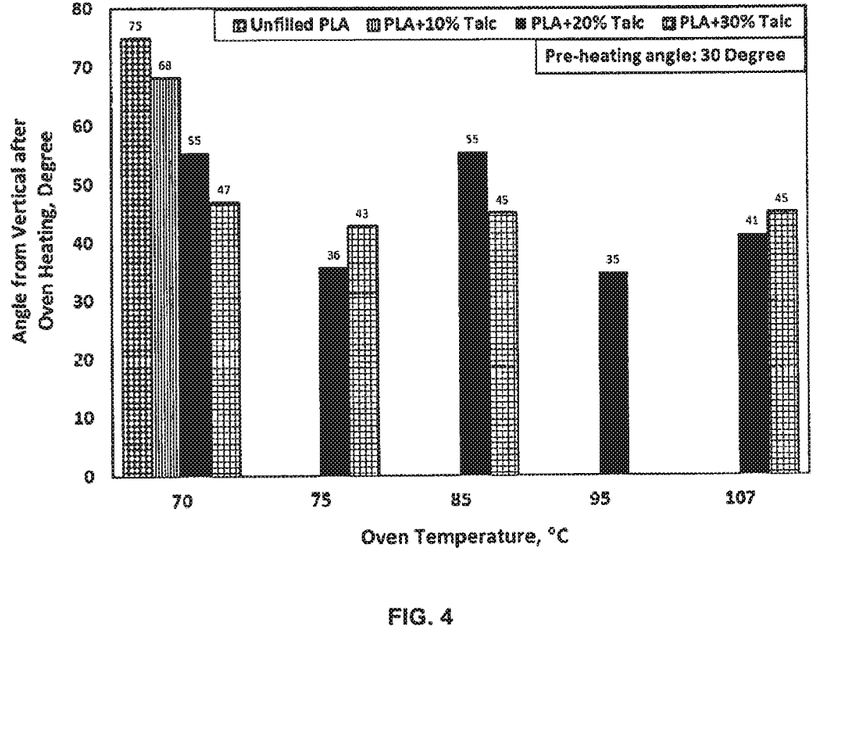
FIG. 4 is a graph showing the thermal stability of specimens containing 0%, 10%, 20%, and 30% talc after oven heating at different temperatures. Results are shown as the angle of the beam after oven heating for the beam with a pre-heating angle of 30 degrees (from vertical position).

As shown in FIG. 3, the thermal stability of FFF-printed objects formed using resin-based material (i.e., polylactic acid-based material) increased significantly as talc was added to the polylactic acid. In addition, increasing the talc content of formulation (e.g., from 10% by weight up to 30% by weight) resulted in further improving the thermal stability of the tested beam structures. In particular, the tested beam structures having a higher percentage of talc added to the polylactic acid exhibited less beam deflection when heated (i.e., the ends of the beams remained higher). This is shown in FIG. 3 by the lower angle of the beam from vertical position after the test specimens were placed in an oven at 70° C. for 20 minutes. Further investigation tests indicated that specimens showing improved thermal stability at 70° C. were also stable at higher oven temperatures of 75° C., 85° C., 95° C., and 107° C. (see FIG. 4). Variation observed in values shown in FIG. 4 for these temperatures represent the standard deviation of the test method caused by factors such as printing defect, oven temperature control, and accuracy of measuring the angle of the beam (from X and Y values). Otherwise, a reduction in thermal stability of the specimen would result in a clear increase in the angle of the beam (i.e., the beam would tend to lean downward toward a horizontal position, as shown in FIG. 3 for unfilled, standard polylactic acid).

Without wishing to be bound by theory, it is believed that the combination of polylactic acid and talc loading increases the crystallization speed and crystalline content of the polylactic acid in combination with providing physical reinforcement from rigid talc structure. It is also believed that this phenomenon may be unique to processing polylactic acid-based materials via fused filament fabrication (e.g., via FUSED DEPOSITION MODELING®), and that other types of polymer processing (e.g., injection molding) may not exhibit this level of improved thermal stability by the addition of talc to polylactic acid.

For the avoidance of doubt, the present application is directed to the subject matter described in the following numbered paragraphs.

1. A composition for fused filament fabrication, the composition comprising: polylactic acid resin and talc, wherein the composition ranges from 50% by weight to 99% by weight polylactic acid resin, wherein the composition ranges from 7% by weight to 40% by weight talc, and wherein the composition is configured to be used in a fused filament fabrication process.

2. The composition according to number paragraph 1, wherein the talc has a median particle size less than 18 microns or less than 1 microns.

3. The composition according to any preceding numbered paragraph, wherein the talc has a median particle size less than 10 microns.

4. The composition according to any preceding numbered paragraph, wherein the talc has a median particle size less than 8 microns.

5. The composition according to any preceding numbered paragraph, wherein the talc has a median particle size less than 6 microns.

6. The composition according to any preceding numbered paragraph, wherein the talc has a median particle size less than 4 microns.

7. The composition according to any preceding numbered paragraph, wherein the talc has a median particle size less than 2 microns, or a median particle size less than 1 micron.

8. The composition according to any preceding numbered paragraph, wherein the talc has a top particle size ($d_{90}$) less than 150 microns.

9. The composition according to any preceding numbered paragraph, wherein the talc has a top particle size ($d_{90}$) less than 100 microns.

10. The composition according to any preceding numbered paragraph, wherein the talc has a top particle size ($d_{90}$) less than 50 microns.

11. The composition according to any preceding numbered paragraph, wherein the talc has a top particle size ($d_{90}$) less than 20 microns or less than 10 microns.

12. The composition according to any preceding numbered paragraph, wherein the talc has a top particle size ($d_{90}$) less than 6 microns.

13. The composition according to any preceding numbered paragraph, wherein the talc has a Hogman rating of 2 or greater.

14. The composition according to any preceding numbered paragraph, wherein the talc has a Hegman rating of 3 or greater.

15. The composition according to any preceding numbered paragraph, wherein the talc has a Hegman rating of 4 or greater.

16. The composition according to any preceding numbered paragraph, wherein the talc has a Hegman rating of 5 or greater, a Hegman rating of 6 or greater, a Hegman rating of 7 or greater, or a Hegman rating of 7.5 or greater.

The composition according to any preceding numbered paragraph, wherein the talc has a BET surface area greater than 2 $m^2/g$.

18. The composition according to any preceding numbered paragraph, wherein the talc has a RET surface area greater than 4 $m^2/g$.

19. The composition according to any preceding numbered paragraph, wherein the talc has a BET surface area greater than 6 $m^2/g$.

20. The composition according to any preceding numbered paragraph, wherein the talc has a BET surface area greater than 8 $m^2/q$.

21. The composition according to any preceding numbered paragraph, wherein the talc has a BET surface area greater than 10 $m^2/g$.

22. The composition according to any preceding numbered paragraph, wherein the talc has a BET surface area less than 20 $m^2/g$.

23. The composition according to any preceding numbered paragraph, wherein the talc has a BET surface area less than 15 $m^2/g$.

24. The composition according to any preceding numbered paragraph, wherein the talc has a BET surface area less than 12 $m^2/g$.

25. The composition according to any preceding numbered paragraph, wherein the talc has a BET surface area less than 10 $m^2/g$.

26. The composition according to any preceding numbered paragraph, wherein the talc has a BET surface area ranging from 2 $m^2/g$ to 20 $m^2/g$.

27. The composition according to any preceding numbered paragraph, wherein the talc has a BET surface area ranging from 4 $m^2/g$ to 15 $m^2/g$.

28. The composition according to any preceding numbered paragraph, wherein the talc has a BET surface area ranging from 4 $m^2/g$ to 10 $m^2/g$.

29. The composition according to any preceding numbered paragraph, wherein the talc has a BET surface area ranging from 10 $m^2/g$ to 15 $m^2/g$.

30. The composition according to any preceding numbered paragraph, wherein the talc has an oil absorption less than 60 grams per 100 grams of talc.

31. The composition according to any preceding numbered paragraph, wherein the talc has an oil absorption less than 50 grams per 100 grams of talc.

32. The composition according to any preceding numbered paragraph, wherein the talc has an oil absorption less than 40 grams per 100 grams of talc.

33. The composition according to any preceding numbered paragraph, wherein the talc has an oil absorption ranging from 20 grams per 100 grams of talc to 60 grams per 100 grams of talc.

34. The composition according to any preceding numbered paragraph, wherein the talc has an oil absorption ranging from 25 grams per 100 grams of talc to 55 grams per 100 grams of talc.

35. The composition according to any preceding numbered paragraph, wherein the talc has a shape factor greater than 10.

38. The composition according to any preceding numbered paragraph, wherein the talc has a shape factor greater than 20.

37. The composition according to any preceding numbered paragraph, wherein the talc has a shape factor greater than 30.

38. The composition according to any preceding numbered paragraph, wherein the talc has a shape factor greater than 40.

39. The composition according to any preceding numbered paragraph, wherein the talc has a shape factor greater than 50.

40. The composition according to any preceding numbered paragraph, wherein the talc has a shape factor greater than 75.

41. The composition according to any preceding numbered paragraph, wherein the talc has a shape factor greater than 100.

42. The composition according to any preceding numbered paragraph, wherein the talc has a shape factor less than 200.

43. The composition according to any preceding numbered paragraph, wherein the talc has a shape factor less than 150.

44. The composition according to any preceding numbered paragraph, wherein the talc has a shape factor less than 100.

45. The composition according to any preceding numbered paragraph, wherein the talc has a shape factor ranging from 10 to 200.

46. The composition according to any preceding numbered paragraph, wherein the talc has a shape factor ranging from 15 to 150.

47. The composition according to any preceding numbered paragraph, wherein the talc has a shape factor ranging from 15 to 50.

48. The composition according to any preceding numbered paragraph, wherein the talc has a shape factor ranging from 15 to 100.

49. The composition according to any preceding numbered paragraph, wherein the composition ranges from 10% by weight to 30% by weight talc, from 10% by weight to 25% by weight talc, or 10% by weight to 20% by weight talc.

50. The composition according to any preceding numbered paragraph, wherein the composition ranges from 15% by weight to 30% by weight talc.

51. The composition according to any preceding numbered paragraph, wherein the composition ranges from 20% by weight to 30% by weight talc.

52. The composition according to any preceding numbered paragraph, wherein the composition ranges from 15% by weight to 25% by weight talc.

53. The composition according to any preceding numbered paragraph, further comprising at least one additional mineral or a mineral replacing the talc.

54. The composition according to any preceding numbered paragraph, wherein the at least one additional mineral is selected from the group consisting of kaolin, bentonite, montmorillonite, pyrophyllite, vermiculite, halloysite, wollastonite, mica, calcium carbonate, titania, perlite, sodium oxysulfate, and diatomaceous earth.

55. A method for generating a resin-based structure, the method comprising: providing a resin source comprising polylactic acid resin and talc, wherein the resin source comprises from 50% by weight to 99% by weight polylactic acid resin, and wherein the resin source comprises from 7% by weight to 40% by weight talc; heating the resin source to a temperature greater than melting temperature for semi-crystalline resins and significantly greater than the glass transition temperature for amorphous resins; and depositing the heated resin source in a layered manner to form the resin-based structure.

56. The method according to numbered paragraph 55, wherein the talc has a median particle size less than 18 microns or less than 12 microns.

57. The method according to any preceding numbered paragraph beginning with paragraph 55, wherein the talc has a median particle size less than 10 microns.

58. The method according to any preceding numbered paragraph beginning with paragraph 55, wherein the talc has a median particle size less than 8 microns.

59. The method according to any preceding numbered paragraph beginning with paragraph 55, wherein the talc has a median particle size less than 6 microns.

60. The method according to any preceding numbered paragraph beginning with paragraph 55, wherein the talc has a median particle size less than 4 microns.

61. The method according to any preceding numbered paragraph beginning with paragraph 55, wherein the talc has a median particle size less than 2 microns, or a median particle size less than 1 micron.

62. The method according to any preceding numbered paragraph beginning with paragraph 55, wherein the talc has a top particle size ($d_{90}$) less than 150 microns.

63. The method according to any preceding numbered paragraph beginning with paragraph 55, wherein the talc has a top particle size ($d_{90}$) less than 100 microns.

64. The method according to any preceding numbered paragraph beginning with paragraph 55, wherein the talc has a top particle size ($d_{90}$) less than 50 microns.

65. The method according to any preceding numbered paragraph beginning with paragraph 55, wherein the talc has a top particle size ($d_{90}$) less than 20 microns or a top particle size less than 10 microns.

68. The method according to any preceding numbered paragraph beginning with paragraph 55, wherein the talc has a top particle size ($d_{90}$) less than 6 microns.

67. The method according to any preceding numbered paragraph beginning with paragraph 55, wherein the talc has a Hegman rating of 2 or greater.

68. The method according to any preceding numbered paragraph beginning with paragraph 55, wherein the talc has a Hegman rating of 3 or greater.

69. The method according to any preceding numbered paragraph beginning with paragraph 55, wherein the talc has a Hegman rating of 4 or greater.

70. The method according to any preceding numbered paragraph beginning with paragraph 55, wherein the talc has a Hegman rating of 5 or greater, a Hegman rating of 6 or greater, a Hegman rating of 7 or greater, or a Hegman rating of 7.5 or greater.

71. The method according to any preceding numbered paragraph beginning with paragraph 55, wherein the talc has a BET surface area greater than 2 $m^2/g$.

72. The method according to any preceding numbered paragraph beginning with paragraph 55, wherein the talc has a BET surface area greater than 4 $m^2/g$.

73. The method according to any preceding numbered paragraph beginning with paragraph 55, wherein the talc has a BET surface area greater than 6 $m^2/g$.

74. The method according to any preceding numbered paragraph beginning with paragraph 55, wherein the talc has a BET surface area greater than 8 $m^2/g$.

75. The method according to any preceding numbered paragraph beginning with paragraph 55, wherein the talc has a BET surface area greater than 10 $m^2/g$.

76. The method according to any preceding numbered paragraph beginning with paragraph 55, wherein the talc has a BET surface area less than 20 $m^2/g$.

77. The method according to any preceding numbered paragraph beginning with paragraph 55, wherein the talc has a BET surface area less than 15 $m^2/g$.

78. The method according to any preceding numbered paragraph beginning with paragraph 55, wherein the talc has a BET surface area less than 12 $m^2/g$.

79. The method according to any preceding numbered paragraph beginning with paragraph 55, wherein the talc has a BET surface area less than 10 $m^{21}$ g.

80. The method according to any preceding numbered paragraph beginning with paragraph 55, wherein the talc has a BET surface area ranging from 2 $m^2/g$ to 20 $m^2/g$.

81. The method according to any preceding numbered paragraph beginning with paragraph 55, wherein the talc has a BET surface area ranging from 4 $m^2/g$ to 15 $m^2/g$.

82. The method according to any preceding numbered paragraph beginning with paragraph 55, wherein the talc has a BET surface area ranging from 4 m²/g to 10 m²/g.

83. The method according to any preceding numbered paragraph beginning with paragraph 55, wherein the talc has a BET surface area ranging from 10 m²/g to 15 ml/g.

84. The method according to any preceding numbered paragraph beginning with paragraph 55, wherein the talc has an oil absorption less than 60 grams per 100 grams of talc.

85. The method according to any preceding numbered paragraph beginning with paragraph 55, wherein the talc has an oil absorption less than 50 grams per 100 grams of talc.

86. The method according to any preceding numbered paragraph beginning with paragraph 55, wherein the talc has an oil absorption less than 40 grams per 100 grams of talc.

87. The method according to any preceding numbered paragraph beginning with paragraph 55, wherein the talc has an oil absorption ranging from 20 grams per 100 grams of talc to 60 grams per 100 grams of talc.

88. The method according to any preceding numbered paragraph beginning with paragraph 55, wherein the talc has an oil absorption ranging from 25 grams per 100 grams of talc to 55 grams per 100 grams of talc.

89. The method according to any preceding numbered paragraph beginning with paragraph 55, wherein the talc has a shape factor greater than 10.

90. The method according to any preceding numbered paragraph beginning with paragraph 55, wherein the talc has a shape factor greater than 20.

91. The method according to any preceding numbered paragraph beginning with paragraph 55, wherein the talc has a shape factor greater than 30.

92. The method according to any preceding numbered paragraph beginning with paragraph 55, wherein the talc has a shape factor greater than 40.

93. The method according to any preceding numbered paragraph beginning with paragraph 55, wherein the talc has a shape factor greater than 50.

94. The method according to any preceding numbered paragraph beginning with paragraph 55, wherein the talc has a shape factor greater than 75.

95. The method according to any preceding numbered paragraph beginning with paragraph 55, wherein the talc has a shape factor greater than 100.

96. The method according to any preceding numbered paragraph beginning with paragraph 55, wherein the talc has a shape factor less than 200.

97. The method according to any preceding numbered paragraph beginning with paragraph 55, wherein the talc has a shape factor less than 150.

98. The method according to any preceding numbered paragraph beginning with paragraph 55, wherein the talc has a shape factor less than 100.

99. The method according to any preceding numbered paragraph beginning with paragraph 55, wherein the talc has a shape factor ranging from 10 to 200.

100. The method according to any preceding numbered paragraph beginning with paragraph 55, wherein the talc has a shape factor ranging from 15 to 150.

101. The method according to any preceding numbered paragraph beginning with paragraph 55, wherein the talc has a shape factor ranging from 15 to 50.

102. The method according to any preceding numbered paragraph beginning with paragraph 55, wherein the talc has a shape factor ranging from 15 to 100.

103. The method according to any preceding numbered paragraph beginning with paragraph 55, wherein the composition ranges from 10% by weight to 30% by weight talc, from 10% by weight to 25% by weight talc, or from 10% by weight to 20% by weight talc.

104. The method according to any preceding numbered paragraph beginning with paragraph 55, wherein the composition ranges from 15% by weight to 30% by weight talc.

105. The method according to any preceding numbered paragraph beginning with paragraph 55, wherein the composition ranges from 20% by weight to 30% by weight talc.

106. The method according to any preceding numbered paragraph beginning with paragraph 55, wherein the composition ranges from 15% by weight to 25% by weight talc.

107. The method according to any preceding numbered paragraph beginning with paragraph 55, further comprising at least one additional mineral or another mineral replacing the talc.

108. The method according to any preceding numbered paragraph beginning with paragraph 55, wherein the at least one additional mineral is selected from the group consisting of kaolin, bentonite, montmorillonite, pyrophyllite, vermiculite, halloysite, wollastonite, mica, calcium carbonate, titania, perlite, sodium oxysulfate, and diatomaceous earth.

109. The composition or method according to any preceding numbered paragraph beginning with paragraph 1, wherein the composition further comprises at least one of plasticizers, impact modifiers, pigments, dyes, colorants, stabilizers, nucleating agents, and other polymer additives or processing aids, configured to modify resin properties.

110. The composition or method according to any preceding numbered paragraph beginning with paragraph 1, wherein the composition further comprises at least one mineral from the group consisting of mica, kaolin, bentonite, montmorillonite, pyrophyllite, vermiculite, halloysite, wollastonite, calcium carbonate, titania, perlite, and diatomaceous earth, and wherein the composition comprises from greater than 0% by weight to 40% by weight of the at least one mineral.

Other embodiments will be apparent to those skilled in the art from consideration of the specification and practice of the embodiments disclosed herein. It is intended that the specification and examples be considered as exemplary only.

What is claimed is:

1. A method for generating a resin-based structure, the method comprising:
providing a resin source comprising polylactic acid resin and talc, wherein the resin source comprises from 50% by weight to 99% by weight polylactic acid resin, and wherein the resin source comprises from 7% by weight to 40% by weight talc, wherein the resin source comprises at least one additional mineral, and wherein the at least one additional mineral is selected from the group consisting of kaolin, bentonite, montmorillonite, pyrophyllite, vermiculite, halloysite, wollastonite, mica, calcium carbonate, titania, perlite, sodium oxysulfate, and diatomaceous earth, and wherein the resin source comprises from greater than 0% by weight to 40% by weight of the at least one mineral;
heating the resin source to a temperature at least equal to the glass transition temperature of the resin source; and
depositing the heated resin source in a layered manner to form the resin-based structure.

2. The method of claim 1, wherein the talc has a median particle size less than 12 microns.

3. The method of claim 1, wherein the talc has a top particle size less than 150 microns.

4. The method of claim 1, wherein the talc has a Hegman rating of 2 or greater.

5. The method of claim 1, wherein the talc has a BET surface area greater than 2 $m^2/g$.

6. The method of claim 1, wherein the talc has an oil absorption less than 60 grams per 100 grams of talc.

7. The method of claim 1, wherein the talc has a shape factor greater than 10.

8. The method of claim 1, wherein the resin source comprises from 10% by weight to 30% by weight talc.

9. The method of claim 1, further comprising adding at least one plasticizer, impact modifier, pigment, dye, colorant, stabilizer, process aid or lubricant to the resin source.

* * * * *